United States Patent [19]
Wakemen

[11] Patent Number: 5,685,268
[45] Date of Patent: Nov. 11, 1997

[54] FUEL LEAKAGE DETECTOR SYSTEM

[75] Inventor: Russell J. Wakemen, Canton, Mich.

[73] Assignee: Siemens Automotive Corporation, Auburn Hills, Mich.

[21] Appl. No.: 650,670

[22] Filed: May 20, 1996

[51] Int. Cl.⁶ .................................................. F02B 77/00
[52] U.S. Cl. ................................ 123/198 D; 73/119 A
[58] Field of Search ........................ 123/198 D, 198 DB, 123/495, 510, 511, 446, 456, 457–464, 479; 73/40.5 R, 113, 117.2, 117.3, 119 A

[56] References Cited

U.S. PATENT DOCUMENTS

| | | | |
|---|---|---|---|
| 4,261,209 | 4/1981 | Hatsuno et al. | 73/119 A |
| 4,413,603 | 11/1983 | Smidey | 123/198 DB |
| 5,085,193 | 2/1992 | Morikawa | 123/458 |
| 5,179,922 | 1/1993 | Bartholomew | 123/198 DB |
| 5,284,120 | 2/1994 | Fukushima et al. | 123/510 |
| 5,313,924 | 5/1994 | Regueiro | 123/458 |
| 5,493,902 | 2/1996 | Glidewell et al. | 73/119 A |

*Primary Examiner*—Thomas N. Moulis
*Attorney, Agent, or Firm*—Russel C. Wells

[57] ABSTRACT

A method and system implementation of a fail-safe algorithm utilizes the engine controller of a fuel-injected vehicle, and detects leakage in the high-pressure portion of the fuel delivery system. A control volume is defined to include the outlet of the high-pressure pump, the fuel line from the pump to the fuel pressure regulator, the regulator solenoid and block, the lines from the regulator block to the fuel rail, the fuel rail itself, the lines from the fuel rail to the fuel injectors, the pressure sensor, the fittings, and the injectors themselves. The total mass of fuel entering and leaving the control volume can be calculated, and the difference corresponds to a portion of the fuel that is not accounted for, presumably as a result of leakage. A fault signal is then produced that can result in any of several corrective measures, including illumination of a warning indicator, engine shutdown, or implementation of a limp-home mode at reduced fuel pressure.

11 Claims, 1 Drawing Sheet

FUEL LEAKAGE DETECTOR SYSTEM

BACKGROUND OF THE INVENTION

1. Field of Invention

This invention relates generally to fuel systems for vehicles, and more particularly, to a system for detecting the presence of a fuel leak in the pressurized portion of a vehicle's fuel system, particularly for a fuel-injected vehicle.

2. Description of the Prior Art

Fuel leaks in fuel delivery systems within vehicles are extremely hazardous, and therefore of great concern. Such concern is particularly acute in vehicles that employ fuel injection systems, since the delivery of fuel through the injectors and into the combustion chambers is achieved at high pressures.

Pressures of up to 150 bar in the fuel rail or fuel distribution manifold of a high pressure system are significantly of more concern than in a conventional port injection system, that typically operate at pressures of 2.5 to 3.0 bar. Although precautions can be taken in the design and manufacture of hydraulic components of the fuel distribution system to minimize the probability of failure, there is a need for monitoring of the fuel system by an engine controller, which may include a computer.

There is, therefore, a need for a fail-safe monitoring system for implementation in a vehicle, particularly in an engine controller, that can be used to detect a leak in the high-pressure portion of the fuel system. Additionally, such a system would determine the appropriate response, which may include illumination of a warning indicator, engine shut-down, etc.

It is, therefore, an object of this invention to provide a system for determining the presence of a leak in the fuel system of a vehicle.

It is another object of this invention to provide a system for determining the presence of a leak in the fuel system of a vehicle, wherein the determination is made using information relating to the operation of the fuel system obtained from conventional sensors present in fuel injected vehicles.

It is also an object of this invention to provide a simple and inexpensive system for determining the presence of a fuel leak in the fuel system of a vehicle, wherein the amount of hardware required over that already present in a conventional fuel injected vehicle to effect such determination is minimized.

It is a further object of this invention to provide a system for determining the presence of a fuel leak in the high pressure portion of a fuel system of a vehicle.

It is additionally an object of this invention to provide a system for determining the presence of a fuel leak in the fuel system of a vehicle, wherein an accurate determination is achieved during transient vehicle conditions, such as during cold-engine operation or during deceleration.

It is also another object of this invention to provide a system for determining the presence of a fuel leak in the fuel system of a vehicle, wherein one or more corrections are initiated in response to the characteristics of the determined leak.

SUMMARY OF THE INVENTION

The foregoing and other objects are achieved by this invention which provides, in a first method aspect thereof, a method of determining the presence of a fuel leak in a predetermined portion of a fuel system of a fuel-injected vehicle. First a first mass of the fuel entering the predetermined portion of the fuel system is determined. Next, a second mass of the fuel leaving the predetermined portion of the fuel system via a first predetermined fuel outlet thereof such as fuel flowing through the injectors is determined and then the difference between the first and second masses of the fuel is determined. This difference is the amount of fuel that maybe the leakage in the system. Some of this leakage maybe the mass of the fuel being returned to the fuel tank.

In one specific embodiment of this first method aspect of the invention, the predetermined portion of the fuel system is provided with a fuel pump. Additionally, there is provided the step of third determining a third mass of the fuel leaving the predetermined portion of the fuel system, via a fuel leakage return outlet of the fuel pump. In a further embodiment, the step of first determining a first mass of the fuel entering the predetermined portion of the fuel system includes the further step of fourth determining a fuel pump fuel mass output. In embodiments of the invention where the fuel pump is of the positive displacement type, which is of the type commonly used on high-pressure gasoline systems, and include cam and radial piston, or swash plate and axial piston arrangements. The step of fourth determining a fuel pump mass output includes the further steps of first measuring a rate of rotation of the engine shaft of the vehicle; first establishing a drive ratio corresponding to the rate of rotation of the driven element of the fuel pump relative to the rate of rotation of the engine shaft; fifth determining a density characteristic of the fuel; and second establishing a predetermined volumetric efficiency characteristic of the fuel pump, corresponding to a ratio of volume of fuel displaced by the fuel pump relative to a geometric displacement parameter of the fuel pump in relation to the rate of rotation of the driven element of the fuel pump, with respect to a fuel pump outlet pressure.

In a specific illustrative embodiment of the invention, the step of fifth determining includes the further step of sixth determining a temperature of the fuel that is being pumped by the fuel pump. Additionally, the step of second establishing a predetermined volumetric efficiency characteristic of the fuel pump includes the further step of storing in a memory a plurality of characteristic parameter values that define the predetermined volumetric efficiency characteristic of the fuel pump.

In another embodiment of the invention, the predetermined portion of the fuel system is provided with a pressure regulator and a fuel delivery arrangement for distributing the fuel to an injector of the fuel-injected vehicle. There is additionally provided the further step of seventh determining a fourth mass of the fuel flowing through the pressure regulator. This step, in certain embodiments of the invention, includes the further steps of third establishing a co-efficient of discharge of the fuel pressure regulator corresponding to a fuel discharge of the pressure regulator in response to an electrical regulator input signal; fourth establishing a characteristic pressure regulator electrovalve flow area of the pressure regulator; second measuring a fuel pressure of the fuel pressure of the fuel delivery arrangement; and determining a density characteristic of the fuel.

In still further embodiments of the invention, also where the predetermined portion of the fuel system is provided with a pressure regulator, there is additionally provided the step of eighth determining a fourth mass of the fuel leaving the predetermined portion of the fuel system via a fuel return outlet of the pressure regulator. The ultimate result of the practice of the method of the present invention is to issue a fuel system status signal that is responsive to the step of first evaluating. That is, if the difference between the first mass of the fuel entering the predetermined portion of the fuel system is greater than the second mass of the fuel that leaves the predetermined portion of the fuel system via the first predetermined fuel outlet thereof, by a predetermined threshold amount, a signal is issued indicating a fault condition. Depending upon the magnitude or other characteristic of the fault, the signal may cause any of a plurality of corrective actions, which can range from simple illumination of a fault indicator, to engine shut-down, and even to the operation of a safety system.

The primary purpose of the method aspect of the invention described hereinabove is the implementation of a fail-safe algorithm that is implemented, in certain embodiments, in the engine controller, and which is used to detect a leak in the high-pressure portion of the fuel system of the vehicle. In essence, a control volume is drawn around the high-pressure portion of the fuel system, including the outlet of the high-pressure pump, the fuel line from the pump to the regulator, the regulator solenoid and block, the lines from the regulator block to the fuel rail, the fuel rail itself, the lines from the fuel rail to the fuel injectors, the pressure sensor, the fittings, and the injectors themselves. The total mass of fuel entering and leaving the control volume can be calculated, and the difference corresponds to fuel that is not accounted for, presumably as a result of leakage.

BRIEF DESCRIPTION OF THE DRAWING

Comprehension of the invention is facilitated by reading the following detailed description, in conjunction with the annexed drawing, in which the single FIGURE.

DETAILED DESCRIPTION OF THE PREFERRED EMBODIMENT

Basic theory of operation

Figure 1:
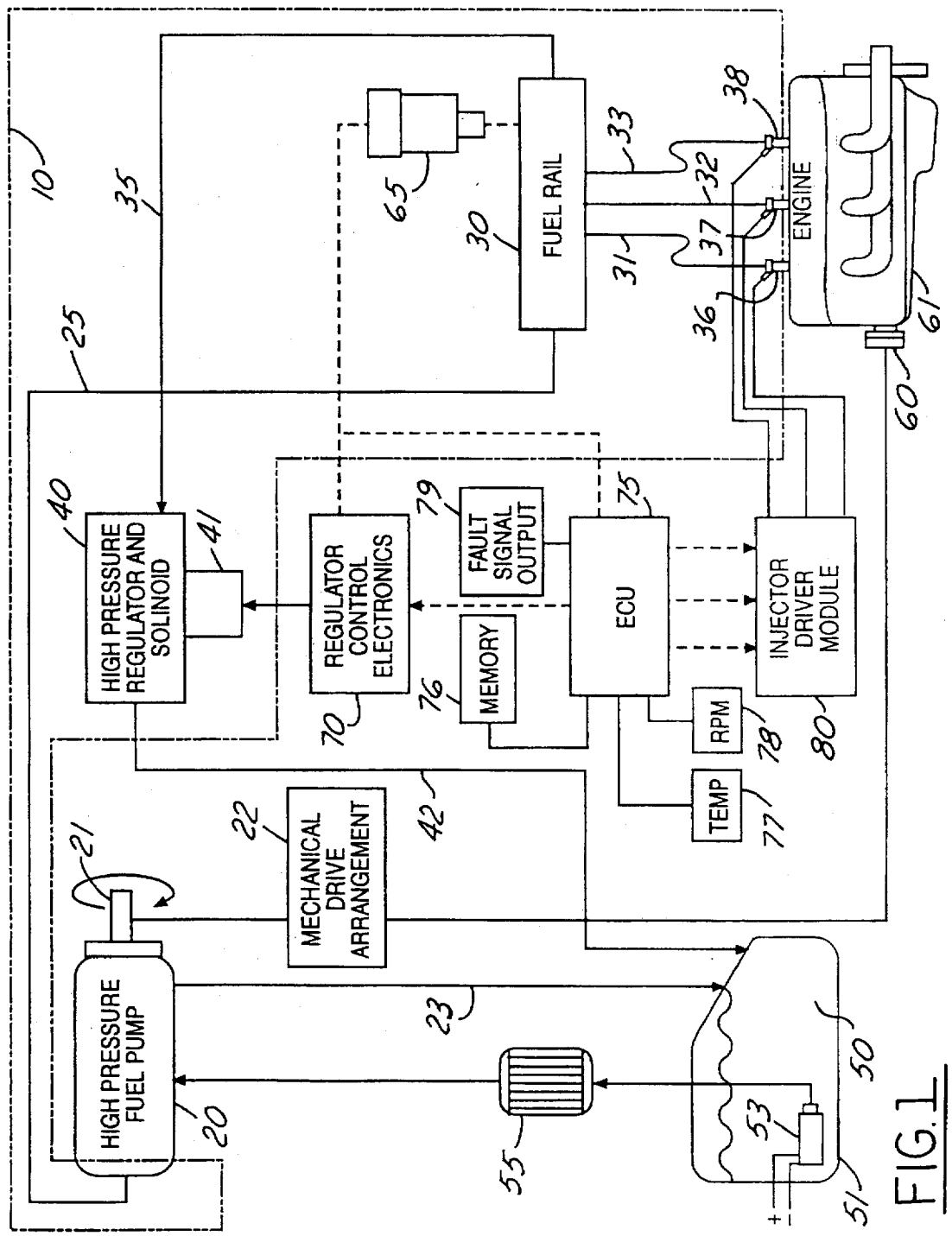
FIG. 1, is a simplified schematic representation of a specific relative embodiment of the invention.

Since the pumps that typically are used on a high-pressure gasoline system are of the positive displacement variety, typically including cam and radial piston or swash plate and actual piston, and since such pumps typically are engine-driven by a fixed-ratio drive arrangement, which may include a timing belt or gearing, the flow-out of the pump can be calculated as:

$$\text{Pump mass output} = (\text{engine RPM}) \times (\text{drive ratio}) \times [\rho_{fuel}(T)] \times [\eta_e(\text{RPM}, P)]$$

Where, engine RPM is defined by input from the existing controller crankshaft position sensor;

drive ratio is defined by the choice of gearing or belt ratio, and the ratio of crankshaft speed to pump shaft speed;

fuel (T) is the density of the fuel, expressed as a function of the temperature of the fuel in the pump. This temperature can be inferred from engine coolant and inlet air temperature sensors already in the control system or measured directly by an added sensor to the pump. The fuel is considered to be incompressible at these pressures for the purpose of this approximation.

$\eta_e$ (RPM, P) is the volumetric efficiency of the pump, representing the ratio of the actual volume of fuel displaced to the geometric displacement of the pump. This function would be mapped for the particular type of pump used in the system as a function of pump speed and outlet pressure. Both of these variables are available to the conventional engine controller with electronic control of fuel pressure.

Outlets from the control volume (in the case of no leaks) would be injector flow into the combustion chamber and regulator flow returning to the fuel tank to control the pressure to the injector. Regulator flow can accurately be mapped as a function of the electrical input to the valve and of the fuel pressure in the rail (assuming that valve back-pressure is relatively close to one bar compared to the 30 to 150 bar fuel pressure) as:

$$\text{Regulator flow} = [C_d(\text{Regulator Command})] \times [A_{valve}(\text{Regulator Command})] \times [(P) \times (2) \times (\rho_{fuel})]^{1/2}$$

Where, $C_d$ (Regulator Command) is the coefficient of discharge of the regulator electrovalve as a function of the electrical input to the regulator from the engine controller to modulate the fuel pressure. This function would be mapped for the valve type used in the system as a function of pulse width modulation (for a duty cycle valve) or of current (for a linear solenoid valve). This information would be available to the engine controller since the regulator command is an output of the controller.

$A_{valve}$ (Regulator Command) is the flow area of the regulator electrovalve as a function of the input command from the engine controller. This would be a known (mapped or calculated) characteristic of the type of valve chosen for the system.

P is the present rail pressure of the system. This information is available to the engine controller since a sensor is already present to provide feedback to the closed loop pressure controller.

$\rho_{fuel}$ is the density of the fuel as a function of fuel temperature, as above.

The flow rate through the injectors can be determined in several ways. One way is to multiply the airflow (calculated or measured) into the engine by the air/fuel ratio being determined by the engine controller for a gross average mass fuel flow rate. Although this will work to some level of accuracy, it may not be a reliable measure of the fuel flow during transience, during cold-engine operation, or during decelerations. These conditions (as opposed to steady state operation under closed-loop oxygen sensor control) may not have an accurately known air/fuel ratio in the controller to be used in the calculation. A more direct estimation of the fuel flow would be:

$$\text{Injector flow} = [\text{static flow rate}(P,T)] \times (\text{Injector Pulse Width}) \times (\text{Cylinders}) \times (\text{Pulses/Revolution}) \times (\text{RPM})$$

Where:

Static flow rate (P,T) is the static injector flow rate as a function of the fuel pressure and temperature. This data would be routinely mapped in the process of calibrating the system and would be available in some form in the engine controller.

Injector Pulse Width is the command sent from the engine controller to open the injector to provide the proper fueling rate that is dictated by the injector-control algorithms.

Cylinders is the number of cylinders in the engine being served by this fuel system.

Pulses/Revolution is the number of injections that take place per engine revolution. For direct injection, sequential injection timing is mandatory, so this number becomes 0.5 for a four-stroke cycle engine and 1.0 for a two-stroke cycle engine.

RPM is engine speed as determined from a crankshaft position sensor in this embodiment of the invention.

Ignoring small variations in flow due to compliance of the system in transient, these three quantities are the only amounts of fuel that intentionally cross the control volume boundary. Changes of phase (i.e., fuel vaporization due to hot fuel handling) can be ignored in this system as the high fuel pressure is well above the vapor pressure of gasoline at reasonable engine operating temperatures. Thus, any other flow out of the control volume must be represent leakage from the hydraulics of the system. Taking leakage as a positive number:

Leakage=Pump Mass Output–Injector Flow–Regulator Flow

The engine controller would continuously calculate this quantity during engine operation based on sensor inputs and tabulated system data. Ideally, the leakage calculation will always return a zero result if the system is intact. However, in practical systems, there must be allowance for errors in such parameters as component mappings, tolerances, temperature information, and so forth. The safety algorithm would have a leakage threshold set somewhat above zero leakage that would be determined by the resolution of the information available to the system. If the leakage calculation exceeded this number, it would be possible to conclude that the additional flow provided by the pump, but not consumed by the injectors or returned by the regulator was being lost to the outside world. This would represent a leakage situation, and the engine controller would be directed to take such actions as lighting a warning indicator, defaulting to some limp-home operation mode, possibly with reduced fuel pressure to minimize the hazard, or ultimately shutting the engine down to prevent further leakage.

Variations of the algorithm are possible for systems with other configurations. An electrically driven pump, for example, does not directly give flow information, but mapping would be possible, and would include information related to pump power consumption (voltage and current) and system pressure. A positive displacement pump of variable displacement would require additional mapping beyond that of the basic system that included the control variable command from the engine controller which caused the displacement to vary. A variable-speed or variable-torque pump drive would also require additional mapping and/or calculation to include the control inputs to these devices.

A dead-headed fuel system could delete the return flow through the regulator valve. A mechanical regulated system would require direct measurement of the return flow through the spring/piston or spring/diaphragm relief valve since this type of valve is not directly commanded or measured by the engine controller.

In accordance with a further embodiment, there is provided a method of determining the presence of a fuel leak in a fuel system of a vehicle, the fuel system having a high pressure fuel pump, a fuel pressure regulator, a fuel pressure sensor for monitoring the fuel pressure in a fuel distribution manifold of a fuel-injected engine of the vehicle, a plurality of fuel injectors for delivery the fuel from the fuel distribution manifold to the fuel-injected engine, and an electronic control system for controlling the operation of the fuel pressure regulator in response to the fuel pressure sensor. In embodiment, there are provided the steps of first determining the mass of the fuel being pumped by the high-pressure fuel pump. Then second determining a second mass of the fuel delivered to the fuel-injected engine via the plurality of fuel injectors and then first evaluating a difference between the first and second masses of the fuel determined in the steps of first and second determining.

Next there are provided the further steps of third determining a third mass of the fuel, leaving the predetermined portion of the fuel system via a fuel leakage return outlet of a fuel pump; and second evaluating a difference between the first mass of the fuel determined in the step of first determining, and the second and third masses of the fuel determined in the steps of second and third determining. There is also provided the further steps of fourth determining a fourth mass of the fuel leaving the predetermined portion of the fuel system, via a fuel return outlet of the pressure regulator; and third evaluating a difference between the first mass of the fuel determined in the step of first determining, and the second and forth masses of the fuel determined in the steps of second and fourth determining. Further, in regard of this embodiment of the second method aspect of the invention, there are provided, in the step of fourth determining, the further steps of third establishing a coefficient of discharge of the fuel pressure regulator corresponding to a fuel discharge of the pressure regulator in response to an electrical regulator input signal; fourth establishing a characteristic pressure regulator electrovalve flow are of the pressure regulator; second measuring an output pressure of the pressure regulator; and determining a density characteristic of the fuel.

In addition, the step of first determining includes the further steps of first measuring the speed of the engine shaft of the fuel-injected engine of the vehicle and first establishing a drive ratio corresponding to the rate of rotation of a driven element of the fuel pump relative to the rate of rotation of the engine shaft. A density characteristic of the fuel is determined and a predetermined volumetric efficiency characteristic of the fuel pump, corresponding to a ratio of volume of fuel displaced by the fuel pump relative to a geometric displacement parameter of the fuel pump in relation to the rate of rotation of a drive element of a fuel pump and with respect to a fuel pump outlet pressure is established. Further, in accordance with this embodiment of the further method aspect of the invention, the step of establishing a predetermined volumetric efficiency characteristic of the fuel pump includes the step of storing in a memory a plurality of characteristic parameter values that define the predetermined volumetric efficiency characteristic of the fuel pump.

In accordance with a system aspect of the invention, there is provided a system for determining the presence of a fuel leak in a predetermined portion of a fuel system of a vehicle, the predetermined portion of the fuel system being arranged hydraulically intermediate of a fuel tank for holding a supply of fuel in a fuel-injected engine of the vehicle. In accordance with the invention, a fuel pump is provided for receiving at a fuel inlet thereof fuel from the fuel tank at a first fuel pressure, and for issuing the fuel at a fuel outlet thereof at a second fuel pressure, the second fuel pressure being greater than the first fuel pressure. A fuel distribution manifold or fuel rail, receives the fuel issued by the fuel pump, and a fuel pressure regulator regulates the pressure of the fuel in the fuel distribution manifold. A pressure sensor is coupled to the fuel distribution manifold to produce a sensor pressure signal that is responsive to the pressure of the fuel in the fuel distribution manifold. A fuel pressure regulator electrovalve element is coupled to the fuel pressure regulator for opening and closing in response to a fuel pressure regulator control signal that is responsive to the sensor pressure signal. In this manner, the pressure of fuel in the fuel rail is controlled to a predetermined regulator fuel pressure. There are additionally provided a plurality of fuel injectors, each having an injector inlet coupled to the fuel rail or fuel distribution manifold for receiving the fuel at the predetermined regulated pressure. A regulator control arrangement receives at an input thereof the sensor pressure signal from the pressure sensor and produces at an output thereof the fuel pressure regulator control signal. The fuel pressure regulator control signal contains fuel pressure control information responsive to the sensor pressure signal. Additionally, there is provided a system control unit coupled to the regulative controller for storing regulator information corresponding to a predetermined operating characteristic of the fuel pressure regulator.

In one embodiment of the invention, the system control unit is provided with an RPM input for receiving information relating to the rate of rotation of an engine shaft or crankshaft of the engine and a temperature input for receiving fuel temperature information. The regulator information corresponds to a coefficient of discharge of the fuel pressure regulator and the fuel pressure regulator electrovalve. Further in regard to this embodiment, the system controller determines a regulator fuel mass quantity that corresponds to the mass of the fuel flowing through the fuel pressure regulator. A memory is coupled to the system control unit for storing fuel pump information corresponding to a predetermined operating characteristic of the fuel pump. The system control unit is arranged to determine a fuel pump mass quantity corresponding to the mass of the fuel flowing out of the fuel pump. A system control unit is also arranged to determine a volumetric efficiency characteristic of the fuel pump, as well as a fuel density characteristic of the fuel being pumped by the fuel pump. In a still further embodiment of the invention, the memory is arranged to store drive information relative to the fuel pump. Moreover, an embodiment of the invention where the fuel pump is provided with a driven fuel pump element which is arranged to be driven by a shaft of the engine of the vehicle, the memory stores drive ratio information that corresponds to the coupling between the engine shaft and the driven element of the fuel pump. In a still further embodiment, as previously noted, the system control unit is arranged to determine an injector fuel mass quantity that corresponds to the mass of the fuel flowing through a fuel injector of the fuel-injected engine of the vehicle.

Basic system embodiment of the Invention

FIG. 1 is a simplified schematic representation of a specific relative embodiment of the invention representing a plurality of components of a vehicle (not shown) some of which are bounded entirely, and others bounded partially, within a control region of a predetermined portion of a fuel system defined by dashed line 10. Generally, the region bounded by the dashed line 10 includes the high-pressure portion of the fuel system of the vehicle, including the outlet of a high-pressure fuel pump 20 and a fuel leakage return line 23. A fuel line 25 connects the output of the high-pressure fuel pump to a fuel distribution manifold or fuel rail 30. A fuel line 35 connects the fuel rail to a high-pressure regulator 40 which has a regulator solenoid 41 and a fuel return line 42 to the fuel tank 51. A plurality of fuel lines 31, 32, and 33, connect the fuel rail 30 to respectively associated ones of fuel injectors 36, 37 and 38; including fittings thereto and the injectors themselves.

In the operation of the system of FIG. 1, fuel 50 is stored in the fuel tank 51. A low-pressure pump 53 pumps the fuel through a filter 55 to the high-pressure fuel pump 20. The fuel pump 20 has a driven element 21 that is coupled via a mechanical drive arrangement 22 to a shaft of the engine 61 of the vehicle. The mechanical energy applied by the engine 61 to the high-pressure fuel pump 20 causes the fuel to be pressurized and conducted by the fuel line 25 to the fuel rail 30. The fuel pressure of the fuel in the fuel rail 30 is measured by a fuel pressure sensor 65 that produces a responsive pressure sensor signal that is electrically conducted to the regulator control electronics 70. The regulator control electronics 70 produce, as will be described below, a signal that controls the operation of the solenoid 41 and the high-pressure regulator 40.

An electronic control unit, ECU, 75 is shown to control the operation of an injector driver module 80 that supplies control signals to the fuel injectors 36, 37 and 38.

A memory 76 is connected to the ECU 75 and contains various items of information that are useful in calculating the fuel output of the fuel pump 20, the flow of fuel through the fuel regulator 40, the amount of fuel flowing through the injectors 36–38 and ultimately the system leakage, if any. The ECU 75 is additionally shown to have a temperature input 77 and an engine speed input 78 for receiving information related the temperature of the fuel and the operating speed of the engine. Ultimately, the ECU generates a signal at an output 79 indicating the status of the system 10, particularly including in this specific illustrative embodiment of the invention, an indication of whether the high-pressure portion of the fuel system has been determined to be leaking.

As previously indicated, some of the information contained in the memory 76 may include data the correlates the density of the fuel ($\rho_{fuel}$ (T)) as a function of temperature. Thus, for example, ECU 75 would select from the memory 76 an appropriate fuel density parameter to be used in calculations, dependent upon the value of the temperature received at the input 77. The memory 76 can additionally contain information relative to the volumetric efficiency "$\eta_e$" of the fuel pump 20. This could include, for example, the ratio of actual fuel volume displaced various engine operating speeds and fuel pressures($\eta_e$ (RPM,P)). The pressure could be determined from the pressure sensor 65 and the engine operating speed from the signal delivered at the speed (RPM) input 78. Still further information would include a drive ratio characteristic of the mechanical drive arrangement 22, the coefficient of discharge of a regulator electrovalve as a function of electrical input ($C_d$ (Regulator Command)), and the characteristic flow area of the regulator electrovalve as a function of input command ($A_{valve}$ (Regulator Command)). Other information that generally is contained in engine controls is also provided to the ECU 75 by means of the storage in memory 76. This might include, for example, the number of cylinders of the engine 61, the static flow rate of the fuel injectors 36–38, the injector pulse width from the injector driver module and the pules/revolution of the engine (i.e. four-stroke or two-stroke).

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this application are proffered to facilitate comprehension of the invention, and should not be construed to limit the scope thereof.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of determining the presence of a fuel leak in a high pressure fuel system of a fuel-injected vehicle having a fuel pump and a fuel pressure regulator, the method comprising the steps of:

determining a first mass of the fuel flowing out of the fuel pump and entering the predetermined portion of the fuel system;

determining a second mass of the fuel leaving the predetermined portion of the fuel system via the fuel injectors; and then generating a difference between the first and the second masses of the fuel, said difference being representative of a fuel leak.

2. The method of claim 1, wherein the fuel pump is of the positive displacement type and is provided with a driven element of the fuel pump operated in response to rotation of an engine shaft of the vehicle, said step of determining the first mass of the fuel comprising the further steps of:

measuring the rate of rotation of the engine shaft of the vehicle;

establishing a drive ratio corresponding to the rate of rotation of the driven element of the fuel pump relative to the rate of rotation of the engine shaft;

determining a density characteristic of the fuel; and then establishing a predetermined volumetric efficiency characteristic of the fuel pump, corresponding to a ratio of volume of fuel displaced by the fuel pump relative to a geometric displacement parameter of the fuel pump in relation to the rate of rotation of the driven element of the fuel pump and with respect to a fuel pump outlet pressure.

3. The method of claim 2, wherein said step of determining the density characteristic of the fuel comprises the further step of determining a temperature of the fuel flowing out of the fuel pump.

4. The method of claim 2, wherein said step of establishing a predetermined volumetric efficiency characteristic of the fuel pump comprises the further step of storing in a memory a plurality of characteristic parameter values that define the predetermined volumetric efficiency characteristics of the fuel pump.

5. The method of claim 1, wherein the predetermined portion of the fuel system is provided with a pressure regulator having a fuel flow return line and a fuel delivery arrangement for distributing the fuel to the injectors of the fuel-injected vehicle, and there is further provided the step of determining a third mass of the fuel flowing through the flow return line of the pressure regulator.

6. The method of claim 5, wherein said step of determining a third mass comprises the further steps of:

establishing a coefficient of discharge of the fuel pressure regulator corresponding to a fuel discharge of the pressure regulator in response to an electrical regulator input signal;

establishing a characteristic pressure regulator electrovalve flow area of the pressure regulator;

measuring a fuel pressure of the fuel delivery arrangement; and then determining a density characteristic of the fuel.

7. The method of claim 1, wherein there is further provided the step of issuing a fuel system status signal responsive to said step of generating a representative of a fuel leak.

8. A system for determining the presence of a fuel leak in a predetermined portion of the a high pressure fuel system of a fuel injected vehicle, the predetermined portion of the fuel system being arranged hydraulically intermediate of a fuel tank for holding a supply of fuel and a fuel-injected engine of the vehicle, the system comprising:

a fuel pump for receiving at a fuel inlet thereof fuel from the fuel tank at a first fuel pressure and flowing the fuel out of a fuel outlet thereof at a second fuel pressure, the second fuel pressure being greater than the first fuel pressure;

means for determining the mass of fuel flowing out of said fuel pump;

a fuel distribution manifold having a manifold inlet for receiving the fuel from said fuel pump;

a plurality of fuel injectors, each having an injector inlet for receiving the fuel from said fuel pump;

means for determining the mass of fuel flowing out of said injectors; and generating means to generate a difference between the mass of the fuel flowing through said fuel pump and the mass of the fuel flowing out of said injectors; and means responsive to said difference for generating a fuel leak signal when said difference is greater than a predetermined value.

9. The system according to claim 8 wherein said fuel pressure regulator is a flow-through fuel pressure regulator.

10. The system according to claim 8 wherein said fuel pressure regulator has a fuel flow return line for returning fuel to the fuel tank when said pressure exceeds a predetermined fuel press; and additionally including means for determining the mass of the fuel in said fuel flow return line; wherein said generating means generates a difference between the mass of the fuel flowing through said fuel pump and the sum of the mass of the fuel flowing out of said injectors and said mass of the fuel flowing in the flow return line.

11. A system for determining the presence of a fuel leak in a predetermined portion of the fuel system of a vehicle, the predetermined portion of the fuel system being arranged hydraulically intermediate of a fuel tank for holding a supply of fuel and a fuel-injected engine of the vehicle, the system comprising:

a fuel pump for receiving at a fuel inlet thereof fuel from the fuel tank at a first fuel pressure and issuing the fuel at a fuel outlet thereof at a second fuel pressure, the second fuel pressure being greater than the first fuel pressure;

a fuel distribution manifold having a manifold inlet for receiving the fuel issued by said fuel pump;

a fuel pressure regulator for regulating a pressure of the fuel in said fuel distribution manifold;

a pressure sensor coupled to said fuel distribution manifold for producing a sensor pressure signal responsive to a pressure of the fuel in said fuel distribution manifold;

regulator control means for receiving at an input thereof said sensor pressure signal for producing at an output thereof a fuel pressure regulator control signal;

fuel pressure regulator electrovalve means responsive to said fuel pressure regulator control signal for opening and closing to maintain the pressure of the fuel in said fuel distribution manifold at a predetermined regulated fuel pressure;

a plurality of fuel injectors, each having an injector inlet coupled to said fuel distribution manifold, for receiving the fuel at the predetermined regulated pressure; and system control means responsive to fuel flowing out said pump and the fuel flow flowing out of said injectors for generating a fuel leak signal representing the difference between the amount of fuel flowing out said pump and the amount of fuel flowing out of said injectors.

* * * * *